(12) United States Patent
Kitai

(10) Patent No.: US 10,442,019 B2
(45) Date of Patent: Oct. 15, 2019

(54) WORKPIECE FEED/CLAMP APPARATUS AND CUTTING MACHINE

(71) Applicants: AMADA HOLDINGS CO., LTD., Kanagawa (JP); AMADA MACHINE TOOLS CO., LTD., Kanagawa (JP)

(72) Inventor: Masataka Kitai, Kanagawa (JP)

(73) Assignees: AMADA HOLDINGS CO., LTD., Kanagawa (JP); AMADA MACHINE TOOLS CO., LTD., Kanagawa (JP)

(*) Notice: Subject to any disclaimer, the term of this patent is extended or adjusted under 35 U.S.C. 154(b) by 0 days.

(21) Appl. No.: 15/765,407

(22) PCT Filed: Sep. 23, 2016

(86) PCT No.: PCT/JP2016/078077
§ 371 (c)(1),
(2) Date: Apr. 2, 2018

(87) PCT Pub. No.: WO2017/061285
PCT Pub. Date: Apr. 13, 2017

(65) Prior Publication Data
US 2018/0304385 A1  Oct. 25, 2018

(30) Foreign Application Priority Data

Oct. 8, 2015 (JP) .................. 2015-199970
Sep. 8, 2016 (JP) .................. 2016-175285

(51) Int. Cl.
*B23D 47/04* (2006.01)
*B23D 33/02* (2006.01)
(Continued)

(52) U.S. Cl.
CPC .......... *B23D 47/045* (2013.01); *B23D 33/02* (2013.01); *B23D 33/04* (2013.01); *B23D 47/04* (2013.01);
(Continued)

(58) Field of Classification Search
CPC ...... B23D 47/04; B23D 55/04; B23D 55/043; B27B 27/02; Y10T 83/446;
(Continued)

(56) References Cited

U.S. PATENT DOCUMENTS 3,474,693 A * 10/1969 Cleland .................. B23D 53/04
83/420
3,625,102 A * 12/1971 Shiino .................... B23D 47/04
269/34

(Continued)

FOREIGN PATENT DOCUMENTS

JP      54-129585    10/1979
JP      4-82615      3/1992
(Continued)

OTHER PUBLICATIONS

International Search Report issued in PCT/JP2016/078077, dated Dec. 20, 2016.

(Continued)

Primary Examiner — Tyrone V Hall, Jr.
(74) Attorney, Agent, or Firm — Greenblum & Bernstein, P.L.C.

(57) ABSTRACT

A feed/clamp apparatus includes a feed vise mechanism provided upstream from a cutting position, and a downstream vise mechanism provided just downstream from the cutting position. The feed vise mechanism includes first/second feed vise jaws, a downstream moving cylinder for moving the first feed vise jaw, and a downstream shifting cylinder for shifting the second feed vise jaw. The downstream vise mechanism includes first/second downstream vise jaws, a downstream moving cylinder for moving the first downstream vise jaw, and a downstream shifting cylinder for shifting a second downstream vise jaw. A vise surface of the second downstream vise jaw is located on one side of the vise reference position when the downstream (Continued)

shifting cylinder is located its stroke end on the one side. A thrust force of the downstream shifting cylinder toward the one side is made equal to a thrust force of the downstream moving cylinder toward another side.

7 Claims, 5 Drawing Sheets

(51) Int. Cl.
    *B23D 55/04*     (2006.01)
    *B26D 7/06*     (2006.01)
    *B25B 5/16*     (2006.01)
    *B26D 7/08*     (2006.01)
    *B23D 33/04*     (2006.01)

(52) U.S. Cl.
    CPC ........... *B23D 55/04* (2013.01); *B23D 55/043* (2013.01); *B26D 7/06* (2013.01); *B26D 7/08* (2013.01); *B25B 5/166* (2013.01); *B26D 7/0658* (2013.01); *B26D 2007/082* (2013.01)

(58) Field of Classification Search
    CPC .............. Y10T 83/4465; Y10T 83/461; Y10T 83/4597; Y10T 83/445; Y10T 83/6531; Y10T 83/4513; Y10T 83/4556; Y10T 83/6532; Y10T 83/4645; Y10T 83/4632
    See application file for complete search history.

(56) References Cited

U.S. PATENT DOCUMENTS

| | | | | |
|---|---|---|---|---|
| 3,910,142 A | * | 10/1975 | Jureit | B23D 59/001 83/268 |
| 4,463,845 A | * | 8/1984 | Harris | B65G 43/08 198/341.02 |
| 5,060,547 A | * | 10/1991 | Moriya | B23D 33/10 83/210 |
| 5,120,378 A | * | 6/1992 | Porter | B27G 11/00 144/278.1 |
| 5,353,910 A | * | 10/1994 | Harris | B23D 47/042 198/345.1 |
| 6,216,574 B1 | * | 4/2001 | Hain | B23Q 1/28 83/241 |
| 7,182,009 B2 | * | 2/2007 | Harris | B23D 47/04 83/206 |
| 2003/0000358 A1 | | 1/2003 | Harris et al. | |
| 2004/0182212 A1 | * | 9/2004 | Harris | B23D 47/04 83/247 |
| 2005/0045012 A1 | * | 3/2005 | Nien | B23D 23/00 83/517 |
| 2007/0017777 A1 | | 1/2007 | Harris | |
| 2012/0180611 A1 | | 7/2012 | Tokiwa | |
| 2012/0297949 A1 | | 11/2012 | Ono | |

FOREIGN PATENT DOCUMENTS

| | | |
|---|---|---|
| JP | 6-31918 | 4/1994 |
| JP | 2011-79109 | 4/2011 |
| WO | 2011/043238 | 4/2011 |
| WO | 2011/099176 | 8/2011 |

OTHER PUBLICATIONS

Notification of Reasons for Refusal issued in Japan Counterpart Patent Appl. No. 2016-175285, dated Dec. 5, 2016, along with an english translation thereof.

Decision to Grant a Patent issued in Japan Counterpart Patent Appl. No. 2016-175285, dated Jul. 28, 2017, along with an english translation thereof.

* cited by examiner

WORKPIECE FEED/CLAMP APPARATUS AND CUTTING MACHINE

TECHNICAL FIELD

The present invention relates to a cutting machine for cutting a workpiece such as a band saw machine or a disc saw machine, and to a workpiece feed/clamp apparatus used with such a cutting machine for feeding and clamping a workpiece.

BACKGROUND ART

In a cutting machine such as a band saw machine, a three-vise type workpiece feed/clamp apparatus is developed instead of a two-vise type workpiece feed/clamp apparatus (see a Patent Document 1 listed below or others). According to a three-vise type workpiece feed/clamp apparatus, it becomes possible to improve productivity by shortening a residual material and by shortening an operation cycle time. A two-vise type workpiece feed/clamp apparatus includes a feed vise mechanism and a main vise mechanism. The feed vise mechanism is provided movably in a feed direction on an upstream side of a cutting position (on an upstream side in the feed direction). The main vise mechanism is provided just on a downstream side of the cutting position (just on a downstream side in the feed direction), or provided dividedly just on an upstream side and just on a downstream side of the cutting position (divided-vise type).

A prior-art three-vise type workpiece feed/clamp apparatus includes a feed vise mechanism movably provided in a feed direction on an upstream side of a cutting position. The feed vise mechanism has a pair of feed vise jaws for clamping a workpiece. The pair of vise jaws are facing to each other in a width direction perpendicular to the feed direction. In addition, the feed mechanism has a feed vise moving cylinder for moving a first feed vise jaw (one of the feed vise jaws) in the width direction and a feed vise shifting cylinder for shifting (hereinafter, the term "shift" will be used to mean "slightly move") a second feed vise jaw (the other of the feed vise jaws) in the width direction. Here, when (a piston of) the feed vise shifting cylinder reaches its stroke end on one side of the width direction, a vise surface of the second feed vise jaw reaches a vise reference position in the width direction.

A prior-art three-vise type workpiece feed/clamp apparatus also includes, in addition to the above-explained feed vise mechanism, an upstream main vise mechanism just on an upstream side of the cutting position (just on an upstream side in the feed direction). The upstream main vise mechanism has a pair of upstream main vise jaws for clamping a workpiece. The pair of upstream main vise are facing to each other in the width direction. In addition, the upstream main vise jaw mechanism has an upstream main moving cylinder for moving a first upstream main vise jaw (one of the upstream main vise jaws) in the width direction and an upstream main shifting cylinder for shifting a second upstream main vise jaw (the other of the upstream main vise jaws) in the width direction. Here, when (a piston of) the upstream main shifting cylinder reaches its stroke end on the one side of the width direction, a vise surface of the second upstream main vise jaw reaches the above-explained vise reference position in the width direction.

The prior-art three-vise type workpiece feed/clamp apparatus includes, in addition to the feed vise mechanism and the upstream main vise mechanism that are explained above, a downstream main vise mechanism just on a downstream side of the cutting position (just on a downstream side in the feed direction). The downstream main vise mechanism has a pair of downstream main vise jaws for clamping a product correspondent portion of the workpiece (a portion that will be a product by being cut out from the workpiece). The pair of downstream main vise are facing to each other in the width direction. In addition, the downstream main vise jaw mechanism has a downstream main moving cylinder for moving a first downstream main vise jaw (one of the downstream main vise jaws) in the width direction and a downstream main shifting cylinder for shifting a second downstream main vise jaw (the other of the downstream main vise jaws) in the width direction. Further, when (a piston of) the downstream main shifting cylinder reaches its stroke end on the one side of the width direction, a vise surface of the second downstream main vise jaw reaches the above-explained vise reference position in the width direction. Here, a thrust force of the downstream main shifting cylinder (a force for pressing the second downstream main vise jaw) toward the one side in the width direction is set larger than a thrust force of the downstream main shifting cylinder (a force for pressing the first downstream main vise jaw) toward the other side in the width direction. As the result, when the product correspondent portion of the workpiece is clamped by the pair of the downstream main vise jaws, the vice surface of the second downstream main vise jaw is located at the vise reference position.

PRIOR ART DOCUMENT

Patent Document

Patent Document 1: Japanese Patent Application Publication No. 2011-79109

SUMMARY OF INVENTION

Meanwhile, there is a case where a leading end portion of the workpiece curves toward the one side in the width direction (a side of the first downstream main vise jaw) or toward the other side (a side of the second downstream main vise jaw). In the case where the leading end portion of the workpiece curves toward the one side in the width direction, it is impossible to clamp the product correspondent portion of the workpiece firmly by the pair of the downstream main vise jaws, even if the vise surface of the second downstream main vise jaw is located at the vise reference position. Therefore, the product cutout after cutting will move and then contact with a saw blade, and thereby chipping of the saw blade may occur. As the result, life (endurance) of the saw blade will be shortened.

On the other hand, in the case where the leading end portion of the workpiece curves toward the other side in the width direction, it is impossible to locate the vise surface of the second downstream main vise jaw at the vise reference position even if the product correspondent portion of the workpiece (a portion that will be a product by being cut out from the workpiece) is clamped by the pair of the downstream main vise jaws. Therefore, a large force toward the one side will be applied to the product cutout after cutting. As the result, the product cutout will move in the width direction, and thereby the same problem as the above-mentioned problem will occur.

An object of the present invention is to provide a workpiece feed/clamp apparatus and a cutting machine that can prevent degradation of life (durability) of a saw blade caused by contacts between a product and the saw blade by restricting the product cutout from a workpiece from moving.

A first aspect of the present invention provides a workpiece feed/clamp apparatus that is used in a cutting machine for cutting a cut position of a workpiece set at a cut position on a feed direction and that feeds the workpiece in the feed direction and then fixes the workpiece on a base of the cutting machine, the apparatus comprising: a feed vise mechanism that is provided on an upstream side of the cutting position movably in the feed direction and includes a pair of feed vise jaws that face to each other in a width direction perpendicular to the feed direction and clamp the workpiece, a feed vise moving cylinder that moves a first of the feed vise jaws in the width direction, and a feed vise shifting cylinder that shifts a second of the feed vise jaws in the width direction; and a downstream main vise mechanism that is provided just on a downstream side of the cutting position and includes a pair of downstream main vise jaws that face to each other in the width direction and clamp a portion correspondent to a product in the workpiece, a downstream main moving cylinder that moves a first of the downstream main vise jaws in the width direction, and a downstream main shifting cylinder that shifts a second of the downstream main vise jaws in the width direction, wherein a vise surface of the second of the downstream main vise jaws passes over the vise reference position in the width direction and then is located on one side from the vise reference position in the width direction when the downstream main shifting cylinder reaches a stroke end on the one side in the width direction, and wherein a thrust force of the downstream main shifting cylinder toward the one side in the width direction is made equal to a thrust force of the downstream main moving cylinder toward another side in the width direction.

A second aspect of the present invention provides a cutting machine that cuts a cut portion of a workpiece set at a cutting position on a feed direction, the machine comprising: a workpiece feed/clamp apparatus according to the above first aspect.

DESCRIPTION OF EMBODIMENTS

Figure 1:
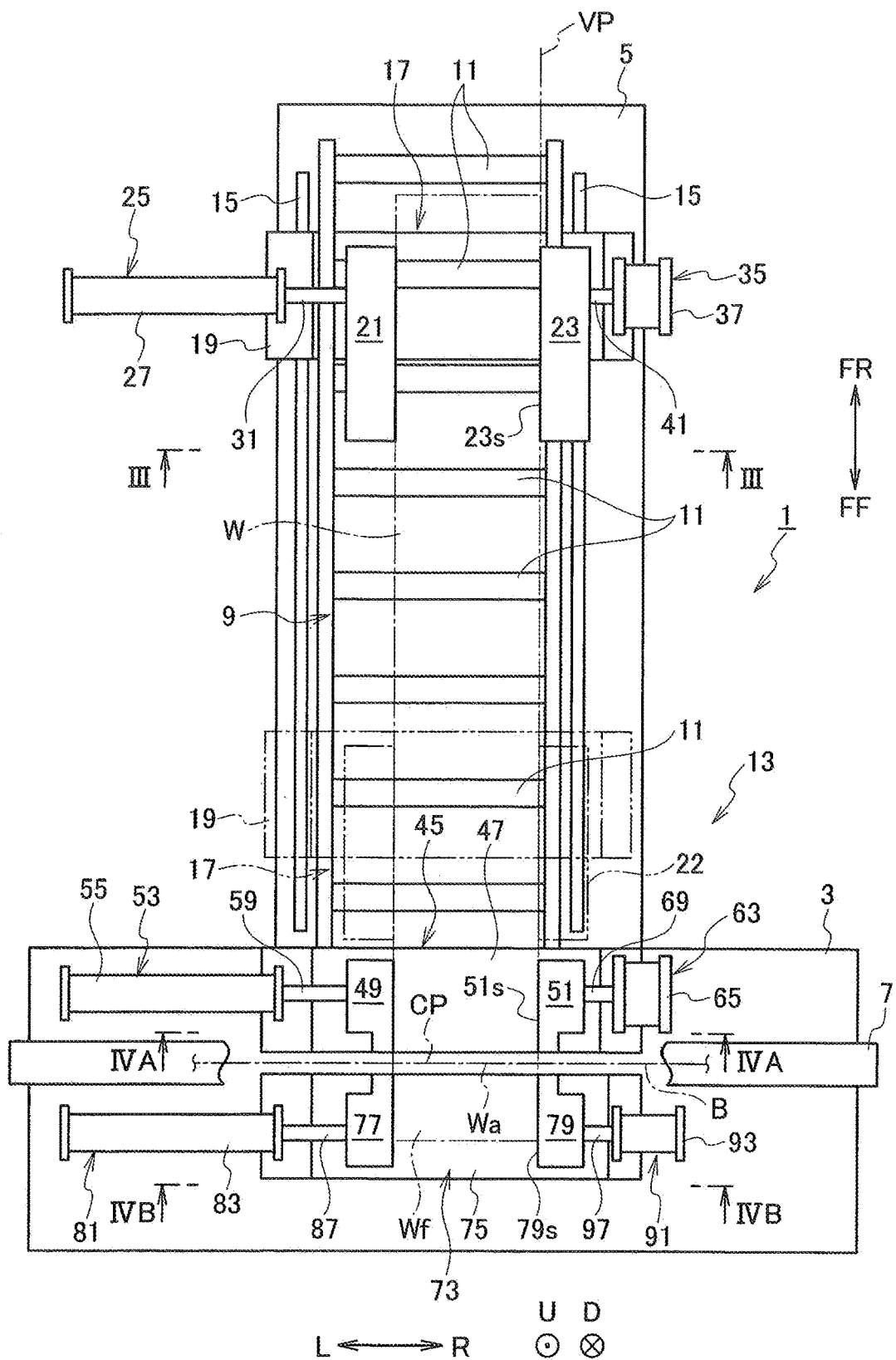
FIG. 1 is a schematic plan view of a band saw machine (cutting machine) provided with a workpiece feed/clamp apparatus according to an embodiment.

An embodiment will be described with reference to the drawings. A "cutting position" is a position on a feed direction where cutting is done. Note that, in the drawings, "FF" indicates a forward direction (the feed direction), "FR" indicates a rearward direction (an opposite direction to the feed direction), "L" indicates a leftward direction (a direction toward one side in a width direction), "R" indicates a rightward direction (a direction toward the other side in the width direction), "U" indicates an upward direction, and "D" indicates a downward direction, respectively.

As shown in FIG. 1, a band saw machine (cutting machine) 1 provided with a workpiece feed/clamp apparatus 13 according to the present embodiment cuts a cut portion Wa of a (metal) workpiece W set at a cutting position CP on a feed direction (forward direction) while circularly running an endless band saw blade B. In addition, the band saw machine 1 includes a base (main frame) 3 extending in a width direction (left-right direction) perpendicular to the feed direction, and a support frame 5 disposed behind the base 3 and extending in a front-rear direction.

On an upper surface of the base 3, a cutting head (saw blade housing) 7 is provided movably in an up-down direction. The cutting head 7 extends in the width direction. In addition, a pair of saw blade wheels (not shown in the drawings) that supports the band saw B is provided rotatably inside the cutting head 7. The band saw B is wound around the pair of saw blade wheels.

A feed table 9 that supports the workpiece W movably in the feed direction is provided on an upper surface of the support frame 5. The feed table 9 has plural feed rollers 11 aligned in the feed direction at intervals. Each of the feed rollers 11 is rotatable about its axis that is parallel to the width direction.

The band saw machine 1 includes the workpiece feed/clamp apparatus 13 that feeds the workpiece W in the feed direction and then fixes it on the base 3.

Hereinafter, specific configuration of the workpiece feed/clamp apparatus 13 will be described. Plural guide rails 15 extending in the feed direction are provided on the upper surface of the support frame 5. A feed vise mechanism 17 for feeding the workpiece W is provided on the plural guide rails 15. The feed vise mechanism 17 is movable in the feed direction (forward direction) and in an opposed direction thereto (rearward direction). Namely, the feed vise mechanism 17 is provided on the support frame 5, with the plural guide rails 15 interposed therebetween, movably in the feed direction and the opposite direction thereto.

Figure 2:
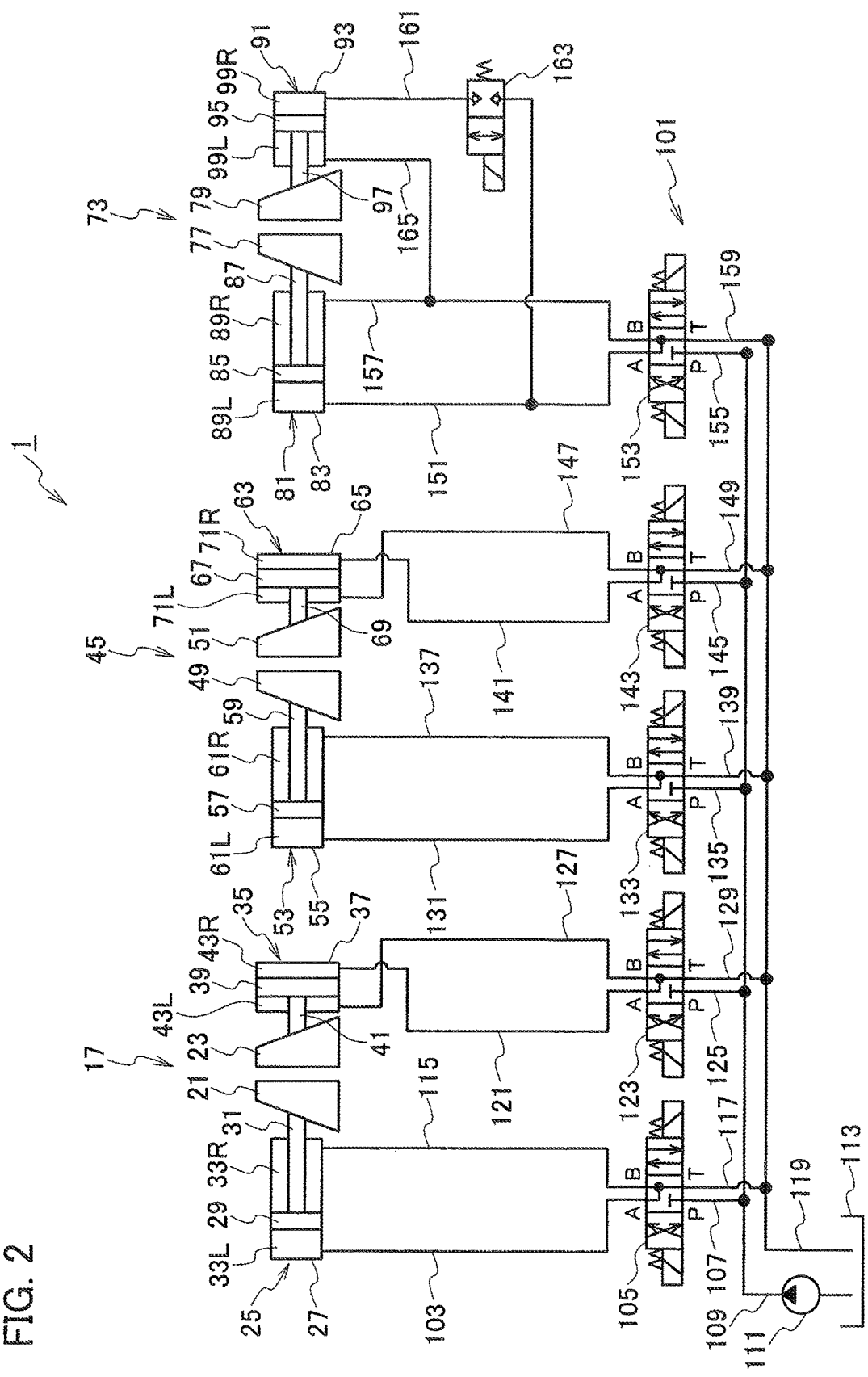
FIG. 2 is an explanatory diagram of an oil hydraulic unit of the workpiece feed/clamp apparatus.
Figure 3:
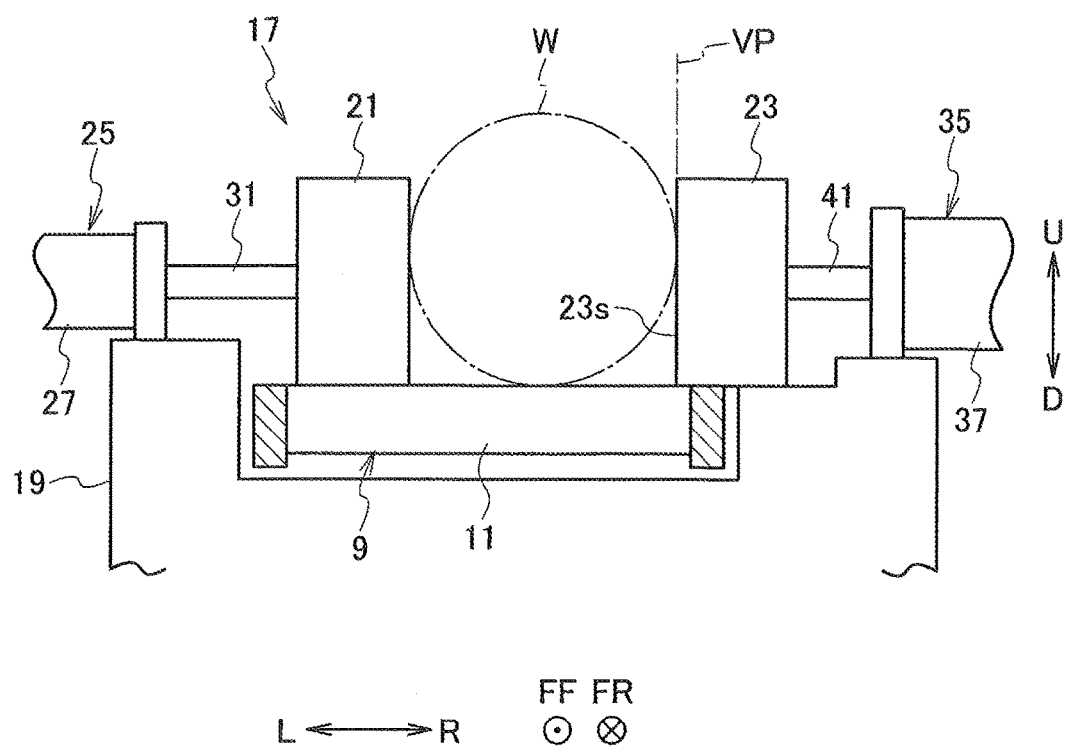
FIG. 3 is a cross-sectional view taken along a line III-III shown in FIG. 1.

Hereinafter, specific configuration of the feed vise mechanism 17 will be described. As shown in FIG. 1 to FIG. 3, a feed vise bed (feed slider) 19 is provided on the support frame 5 (with the plural guide rails 15 interposed therebetween). The feed vise bed 19 is movable in the feed direction and the opposite direction thereto, and has a U-shape with its upper face opened. In addition, the feed vise bed 19 is moved in the feed direction and the opposite direction thereto by driving an electric motor (not shown in the drawings) and a ball screw (not shown in the drawings) (or an oil hydraulic cylinder (not shown in the drawings)) that are provided on the support frame 5. A pair of feed vise jaws 21 and 23 that clamps the workpiece W is provided on the feed vise bed 19. The pair of feed vise jaws 21 and 23 are facing to each other in the width direction. The pair of feed vise jaws 21 and 23 is located on an upper side of the feed table 9. The first feed vise jaw (one of the feed vise jaws) 21 is located on a left side (one side of the width direction) of the second feed vise jaw (the other of the feed vise jaws) 23.

An oil hydraulic type feed vise moving cylinder 25 that moves the first feed vise jaw 21 in the width direction is provided at a left portion of the feed vise bed 19. The feed vise moving cylinder 25 has a cylinder main body 27 disposed at the left portion of the feed vise bed 19, a piston (see FIG. 2) provided within the cylinder main body 27 movably in the width direction, and a rod 31 provided between the piston 29 and the first feed vise jaw 21. A base end of the rod 31 is connected with the piston 29, and a fore end thereof is connected with the first feed vise jaw 21. In addition, an inside of the cylinder main body 27 is divided into a left cylinder chamber (cylinder chamber on the one side of the width direction) 33L and a right cylinder chamber (cylinder chamber on the other side of the width direction) 33R by the piston 29.

An oil hydraulic type feed vise shifting cylinder 35 that shifts (slightly moves) the second feed vise jaw 23 in the width direction is provided at a right portion of the feed vise bed 19. The feed vise shifting cylinder 35 has a cylinder main body 37 disposed at the right portion of the feed vise bed 19, a piston 39 (see FIG. 2) provided within the cylinder main body 37 movably in the width direction, and a rod 41 provided between the piston 39 and the second feed vise jaw 23. A base end of the rod 41 is connected with the piston 39, and a fore end thereof is connected with the second feed vise jaw 23. In addition, an inside of the cylinder main body 37 is divided into a left cylinder chamber 43L and a right cylinder chamber 43R by the piston 39. Further, a vise surface 23s of the second feed vise jaw 23 is located at a vise reference position VP on the width direction when (the piston 39) of the feed vise shifting cylinder 35 reaches its left-side stroke end. The vise reference position VP is a position that serves as reference for feeding the workpiece W.

Here, a leftward thrust force of the feed vise shifting cylinder 35 (a force for pressing the second feed vise jaw 23) is set larger than a rightward thrust force of the feed vise moving cylinder 25 (a force for pressing the first feed vise jaw 21). Specifically, working oil (a type of working fluid) having an identical pressure is supplied to the right cylinder chamber 43R of the feed vise shifting cylinder 35 and the left cylinder chamber 33L of the feed vise moving cylinder 25. Then, a cross-sectional area of the right cylinder chamber 43R of the feed vise shifting cylinder 35 is made larger than a cross-sectional area of the left cylinder chamber 33L of the feed vise moving cylinder 25. Therefore, the leftward thrust force of the feed vise shifting cylinder 35 becomes larger than the rightward thrust force of the feed vise moving cylinder 25. As the result, when the workpiece W is clamped by the pair of feed vise jaws 21 and 23, the vise surface 23s of the second feed vise jaw 23 is located at the vise reference position VP.

An upstream main vise mechanism 45 for fixing the workpiece W on the base 3 is provided on the base 3 just on an upstream side of the cutting position CP (just on an upstream side in the feed direction).

Figure 4:
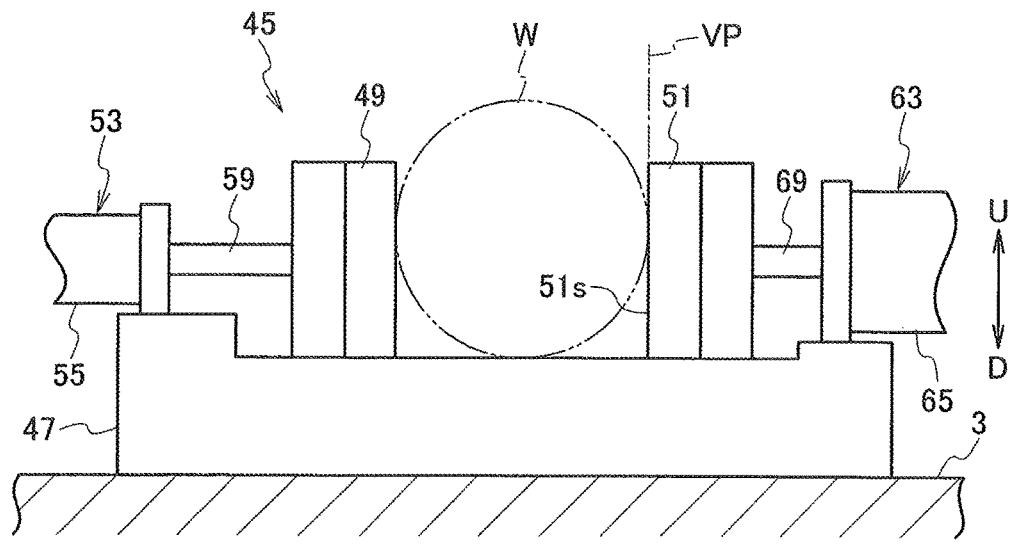
FIG. 4(a) is a cross-sectional view taken along a line IVA-IVA shown in FIG. 1.
FIG. 4(b) is a cross-sectional view taken along a line IVB-IVB shown in FIG. 1.
Figure 4:
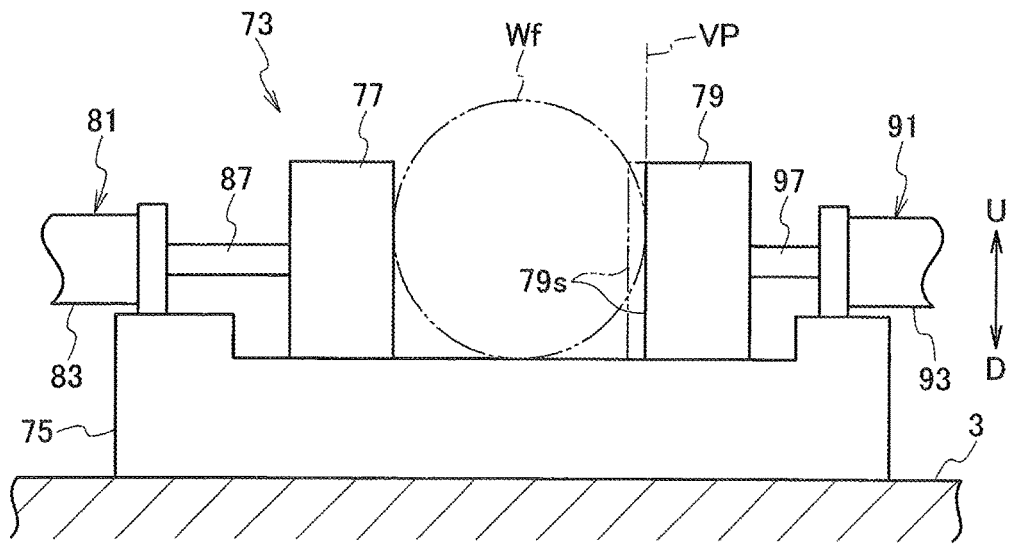

Hereinafter, specific configuration of the upstream main vise mechanism 45 will be described. As shown in FIG. 1, FIG. 2 and FIG. 4(a), the upstream main vise mechanism 45 is disposed on the base 3 just on the upstream side of the cutting position CP, and has an upstream main vise bed (upstream table) 47 that supports the workpiece W. In addition, a pair of upstream main vise jaws 49 and 51 that clamps the workpiece W is provided on the upstream main vise bed 47. The pair of upstream main vise jaws 49 and 51 are facing to each other in the width direction. The first upstream main vise jaw (one of the upstream main vise jaws) 49 is located on a left side (the one side of the width direction) of the second upstream main vise jaw (the other of the upstream main vise jaws) 51.

An oil hydraulic type upstream main moving cylinder 53 that moves the first upstream main vise jaw 49 in the width direction is provided at a left portion of the upstream main vise bed 47. The upstream main moving cylinder 53 has a cylinder main body 55 disposed at the left portion of the upstream main vise bed 47, a piston 57 (see FIG. 2) provided within the cylinder main body 55 movably in the width direction, and a rod 59 provided between the piston 57 and the first upstream main vise jaw 49. A base end of the rod 59 is connected with the piston 57, and a fore end thereof is connected with the first upstream main vise jaw 49. In addition, an inside of the cylinder main body 55 is divided into a left cylinder chamber (cylinder chamber on the one side of the width direction) 61L and a right cylinder chamber (cylinder chamber on the other side of the width direction) 61R by the piston 57.

An oil hydraulic type upstream main shifting cylinder 63 that shifts the second upstream main vise jaw 51 in the width direction is provided at a right portion of the upstream main vise bed 47. The upstream main shifting cylinder 63 has a cylinder main body 65 disposed at the right portion of the upstream main vise bed 47, a piston 67 (see FIG. 2) provided within the cylinder main body 65 movably in the width direction, and a rod 69 provided between the piston 67 and the second upstream main vise jaw 51. A base end of the rod 69 is connected with the piston 67, and a fore end thereof is connected with the second upstream main vise jaw 51. In addition, an inside of the cylinder main body 65 is divided into a left cylinder chamber 71L and a right cylinder chamber 71R by the piston 67. Further, a vise surface 51s of the second upstream main vise jaw 51 is located at the above-mentioned vise reference position VP when (the piston 67 of) the upstream main shifting cylinder 63 reaches its left-side stroke end.

Here, a leftward thrust force of the upstream main shifting cylinder 63 (a force for pressing the second upstream main vise jaw 51) is set larger than a rightward thrust force of the upstream main moving cylinder 53 (a force for pressing the first upstream main vise jaw 49). Specifically, working oil (a type of working fluid) having an identical pressure is supplied to the right cylinder chamber 71R of the upstream main shifting cylinder 63 and the left cylinder chamber 61L of the upstream main moving cylinder 53. Then, a cross-sectional area of the right cylinder chamber 71R of the upstream main shifting cylinder 63 is made larger than a cross-sectional area of the left cylinder chamber 61L of the upstream main moving cylinder 53. Therefore, the leftward thrust force of the upstream main shifting cylinder 63 becomes larger than the rightward thrust force of the upstream main moving cylinder 53. As the result, when the workpiece W is clamped by the pair of upstream main vise jaws 49 and 51, the vise surface 51s of the second upstream main vise jaw 51 is located at the vise reference position VP.

A downstream main vise mechanism 73 for fixing a product correspondent portion Wf of the workpiece W (a portion that will be a product by being cut out from the workpiece W) on the base 3 is provided on the base 3 just on a downstream side of the cutting position CP (just on a downstream side in the feed direction).

Hereinafter, specific configuration of the downstream main vise mechanism 73 will be described. As shown in FIG. 1, FIG. 2 and FIG. 4(b), the downstream main vise mechanism 73 is disposed on the base 3 just on the downstream side of the cutting position CP, and has a downstream main vise bed (downstream table) 75 that supports the product correspondent portion Wf of the workpiece W. In addition, a pair of downstream main vise jaws 77 and 79 that clamps the product correspondent portion Wf of the workpiece W is provided on the downstream main vise bed 75. The pair of downstream main vise jaws 77 and 79 are facing to each other in the width direction. The first downstream main vise jaw (one of the downstream main vise jaws) 77 is located on a left side (the one side of the width direction) of the second downstream main vise jaw (the other of the downstream main vise jaws) 79.

An oil hydraulic type downstream main moving cylinder 81 that moves the first downstream main vise jaw 77 in the width direction is provided at a left portion of the downstream main vise bed 75. The downstream main moving cylinder 81 has a cylinder main body 83 disposed at the left portion of the downstream main vise bed 75, a piston 85 (see FIG. 2) provided within the cylinder main body 83 movably in the width direction, and a rod 87 provided between the piston 85 and the first downstream main vise jaw 77. A base end of the rod 87 is connected with the piston 85, and a fore end thereof is connected with the first downstream main vise jaw 77. In addition, an inside of the cylinder main body 83 is divided into a left cylinder chamber (cylinder chamber on the one side of the width direction) 89L and a right cylinder chamber (cylinder chamber on the other side of the width direction) 89R by the piston 85.

An oil hydraulic type downstream main shifting cylinder 91 that shifts the second downstream main vise jaw 79 in the width direction is provided at a right portion of the downstream main vise bed 75. The downstream main shifting cylinder 91 has a cylinder main body 93 disposed at the right portion of the downstream main vise bed 75, a piston 95 (see FIG. 2) provided within the cylinder main body 93 movably in the width direction, and a rod 97 provided between the piston 95 and the second downstream main vise jaw 79. A base end of the rod 97 is connected with the piston 95, and a fore end thereof is connected with the second downstream main vise jaw 79. In addition, an inside of the cylinder main body 93 is divided into a left cylinder chamber 99L and a right cylinder chamber 99R by the piston 95. Note that a vise surface 79s of the second downstream main vise jaw 79 passes over the above-mentioned vise reference position VP and then is located, for example, on a 3-10 mm left side of the vise reference position VP when (the piston 95) of the downstream main shifting cylinder 91 reaches its left-side stroke end.

Here, a leftward thrust force of the downstream main shifting cylinder 91 (a force for pressing the second downstream main vise jaw 79) is set equal to a rightward thrust force of the downstream main moving cylinder 81 (a force for pressing the first downstream main vise jaw 77). Specifically, working oil (a type of working fluid) having an identical pressure is supplied to the right cylinder chamber 99R of the downstream main shifting cylinder 91 and the left cylinder chamber 89L of the downstream main moving cylinder 81. Then, a cross-sectional area of the right cylinder chamber 99R of the downstream main shifting cylinder 91 is made equal to a cross-sectional area of the left cylinder chamber 89L of the downstream main moving cylinder 81. The phrase "(areas are) equal" means "substantially equal", i.e. means that a percentage of a difference between the cross-sectional area of the right cylinder chamber 93R and the left cylinder chamber 89L with respect to the cross-sectional area of the left cylinder chamber 89L is within ±5%. Similarly, the phrase "(thrust forces are) equal" means "substantially equal, i.e. means that a percentage of a difference between the leftward thrust force of the downstream main shifting cylinder 91 and the rightward thrust force of the downstream main moving cylinder 81 with respect to the rightward thrust force of the downstream main moving cylinder 81 is within ±5%.

As shown in an oil hydraulic piping circuit diagram of FIG. 2, the band saw machine 1 includes an oil hydraulic unit 101 for driving the feed vise moving cylinder 25, the feed vise shifting cylinder 35, the upstream main moving cylinder 53, the upstream main shifting cylinder 63, the downstream main moving cylinder 81 and the downstream main shifting cylinder 91.

Hereinafter, specific configuration of the oil hydraulic unit 101 will be described. The left cylinder chamber 33L of the feed vise moving cylinder 25 is connected with one end of a pipe (circuit) 103, and the other end of the pipe 103 is connected to an A port of a control valve 105 for the feed vise moving cylinder 25. A P port of the control valve 105 is connected with one end of a pipe 107, and the other end of the pipe 107 is connected to a main pipe 109. Then, one end of the main pipe 109 is connected with an ejection side of a pump (working fluid supply source) 111 that supplies working oil, and a suction side of the pump 111 is connected to a tank 113 of working oil. In addition, the right cylinder chamber 33R of the feed vise moving cylinder 25 is connected with one end of a pipe (circuit) 115, and the other end of the pipe 115 is connected to a B port of the control valve 105. Further, a T port of the control valve 105 is connected with one end of a pipe 117, and the other end of the pipe 117 is connected with a main pipe 119. One end of the main pipe 119 is connected to the tank 113.

In a neutral state of the control valve 105 (a state shown in FIG. 2), the left cylinder chamber 33L and the right cylinder chamber 33R are communicated with each other, and thereby no thrust force is generated by the feed vise moving cylinder 25. Note that superfluous working oil is discharged to the tank 113 through the pipe 117 and the main pipe 119. When the P port and the A port are communicated with each other and the T port and the B port are communicated with each other by operating the control valve 105 with the pump 111 being driven, working oil is supplied to the left cylinder chamber 33L through the main pipe 109, the pipe 107 and the pipe 103. In addition, working oil in the right cylinder chamber 33R is discharged to the tank 113 through the pipe 115, the pipe 117 and the main pipe 119. Therefore, the first feed vise jaw 21 is moved rightward (toward the other side in the width direction).

On the other hand, when the P port and the B port are communicated with each other and the T port and the A port are communicated with each other by operating the control valve 105 with the pump 111 being operated, working oil is supplied to the right cylinder chamber 33R through the main pipe 109, the pipe 115 and the pipe 107. In addition, working oil in the left cylinder chamber 33L is discharged to the tank 113 through the pipe 103, the pipe 117 and the main pipe 119. Therefore, the first feed vise jaw 21 is moved leftward (toward the one side in the width direction).

The right cylinder chamber 43R of the feed vise shifting cylinder 35 is connected with one end of a pipe 121, and the other end of the pipe 121 is connected to an A port of a control valve 123 for the feed vise shifting cylinder 35. A P port of the control valve 123 is connected with one end of a pipe 125, and the other end of the pipe 125 is connected to the main pipe 109. In addition, the left cylinder chamber 43L of the feed vise shifting cylinder 35 is connected with one end of a pipe 127, and the other end of the pipe 127 is connected to a B port of the control valve 123. Further, a T port of the control valve 123 is connected with one end of a pipe 129, and the other end of the pipe 129 is connected with the main pipe 119.

In a neutral state of the control valve 123 (a state shown in FIG. 2), the left cylinder chamber 43L and the right cylinder chamber 43R are communicated with each other, and thereby no thrust force is generated by the feed vise shifting cylinder 35. Note that superfluous working oil is discharged to the tank 113 through the pipe 129 and the main pipe 119. When the P port and the A port are communicated with each other and the T port and the B port are communicated with each other by operating the control valve 123 with the pump 111 being driven, working oil is supplied to the right cylinder chamber 43R through the main pipe 109, the pipe 125 and the pipe 121. In addition, working oil in the left cylinder chamber 43L is discharged to the tank 113 through the pipe 127, the pipe 129 and the main pipe 119. Therefore, the second feed vise jaw 23 is shifted leftward (toward the one side in the width direction).

On the other hand, when the P port and the B port are communicated with each other and the T port and the A port are communicated with each other by operating the control valve 123 with the pump 111 being operated, working oil is supplied to the left cylinder chamber 43L through the main pipe 109, the pipe 125 and the pipe 127. In addition, working oil in the right cylinder chamber 43R is discharged to the tank 113 through the pipe 121, the pipe 129 and the main pipe 119. Therefore, the second feed vise jaw 23 is shifted rightward (toward the other side in the width direction).

The left cylinder chamber 61L of the upstream main moving cylinder 53 is connected with one end of a pipe 131, and the other end of the pipe 131 is connected to an A port of a control valve 133 for the upstream main moving cylinder 53. A P port of the control valve 133 is connected with one end of a pipe 135, and the other end of the pipe 135 is connected to the main pipe 109. In addition, the right cylinder chamber 61R of the upstream main moving cylinder 53 is connected with one end of a pipe 137, and the other end of the pipe 137 is connected to a B port of the control valve 133. Further, a T port of the control valve 133 is connected with one end of a pipe 139, and the other end of the pipe 139 is connected with the main pipe 119.

In a neutral state of the control valve 133 (a state shown in FIG. 2), the left cylinder chamber 61L and the right cylinder chamber 61R are communicated with each other, and thereby no thrust force is generated by the upstream main moving cylinder 53. Note that superfluous working oil is discharged to the tank 113 through the pipe 139 and the main pipe 119. When the P port and the A port are communicated with each other and the T port and the B port are communicated with each other by operating the control valve 133 with the pump 111 being driven, working oil is supplied to the left cylinder chamber 61L of the upstream main moving cylinder 53 through the main pipe 109, the pipe 135 and the pipe 131. In addition, working oil in the right cylinder chamber 61R of the upstream main moving cylinder 53 is discharged to the tank 113 through the pipe 137, the pipe 139 and the main pipe 119. Therefore, the first upstream main vise jaw 49 is moved rightward (toward the other side in the width direction).

On the other hand, when the P port and the B port are communicated with each other and the T port and the A port are communicated with each other by operating the control valve 133 with the pump 111 being operated, working oil is supplied to the right cylinder chamber 61R through the main pipe 109, the pipe 135 and the pipe 137. In addition, working oil in the left cylinder chamber 61L is discharged to the tank 113 through the pipe 131, the pipe 139 and the main pipe 119. Therefore, the first upstream main vise jaw 49 is moved leftward (toward the one side in the width direction).

The right cylinder chamber 71R of the upstream main shifting cylinder 63 is connected with one end of a pipe 141, and the other end of the pipe 141 is connected to an A port of a control valve 143 for the upstream main shifting cylinder 63. A P port of the control valve 143 is connected with one end of a pipe 145, and the other end of the pipe 145 is connected to the main pipe 109. In addition, the left cylinder chamber 71L of the upstream main shifting cylinder 63 is connected with one end of a pipe 147, and the other end of the pipe 147 is connected to a B port of the control valve 143. Further, a T port of the control valve 143 is connected with one end of a pipe 149, and the other end of the pipe 149 is connected with the main pipe 119.

In a neutral state of the control valve 143 (a state shown in FIG. 2), the left cylinder chamber 71L and the right cylinder chamber 71R are communicated with each other, and thereby no thrust force is generated by the upstream main shifting cylinder 63. Note that superfluous working oil is discharged to the tank 113 through the pipe 149 and the main pipe 119. When the P port and the A port are communicated with each other and the T port and the B port are communicated with each other by operating the control valve 143 with the pump 111 being driven, working oil is supplied to the right cylinder chamber 71R of the upstream main shifting cylinder 63 through the main pipe 109, the pipe 145 and the pipe 141. In addition, working oil in the left cylinder chamber 71L of the upstream main shifting cylinder 63 is discharged to the tank 113 through the pipe 147, the pipe 149 and the main pipe 119. Therefore, the second upstream main vise jaw 51 is shifted leftward (toward the one side in the width direction).

On the other hand, when the P port and the B port are communicated with each other and the T port and the A port are communicated with each other by operating the control valve 143 with the pump 111 being operated, working oil is supplied to the left cylinder chamber 71L through the main pipe 109, the pipe 145 and the pipe 147. In addition, working oil in the right cylinder chamber 71R is discharged to the tank 113 through the pipe 141, the pipe 149 and the main pipe 119. Therefore, the second upstream main vise jaw 51 is shifted rightward (toward the other side in the width direction).

The left cylinder chamber 89L of the downstream main moving cylinder 81 is connected with one end of a pipe 151, and the other end of the pipe 151 is connected to an A port of a control valve 153 for the downstream main moving cylinder 81. A P port of the control valve 153 is connected with one end of a pipe 155, and the other end of the pipe 155 is connected to the other end of the main pipe 109. In addition, the right cylinder chamber 89R of the downstream main moving cylinder 81 is connected with one end of a pipe 157, and the other end of the pipe 157 is connected to a B port of the control valve 153. Further, a T port of the control valve 153 is connected with one end of a pipe 159, and the other end of the pipe 159 is connected with the other end of the main pipe 119.

The right cylinder chamber 99R of the downstream main shifting cylinder 91 is connected with one end of a pipe 161, and the other end of the pipe 161 is connected to the pipe 151. A non-leak valve 163 is provided on the pipe 161. In addition, the left cylinder chamber 99L of the downstream main shifting cylinder 91 is connected with one end of a pipe 165, and the other end of the pipe 165 is connected to the pipe 157. Therefore, the left cylinder chamber 99L of the downstream main shifting cylinder 91 is communicated with the right cylinder chamber 89R of the downstream main moving cylinder 81 through the pipes 165 and 157.

In a neutral state of the control valve 153 (a state shown in FIG. 2), the left cylinder chamber 89L and the right cylinder chamber 89R are communicated with each other in the downstream main moving cylinder 81, and thereby no thrust force is generated. Similarly, the left cylinder chamber 99L and the right cylinder chamber 99R are communicated with each other in the downstream main shifting cylinder 91, and thereby no thrust force is generated. Note that superfluous working oil is discharged to the tank 113 through the pipe 159 and the main pipe 119. When the P port and the A port are communicated with each other and the T port and the B port are communicated with each other by operating the control valve 153 with the pump 111 being driven and the non-leak valve 163 is opened, working oil is supplied to the left cylinder chamber 89L of the downstream main moving cylinder 81 through the main pipe 109, the pipe 155 and the pipe 151. In addition, working oil in the right cylinder chamber 89R of the downstream main moving cylinder 81 is discharged to the tank 113 through the pipe 157, the pipe 159 and the main pipe 119. Along with it, working oil is supplied to the right cylinder chamber 99R of the downstream main shifting cylinder 91 through the main pipe 109, the pipe 155, the pipe 151 and the pipe 161. In addition, working oil in the left cylinder chamber 99L of the downstream main shifting cylinder 91 is discharged to the tank 113 through the pipe 165, the pipe 157, the pipe 159 and the main pipe 119. According to this, the first downstream main vise jaw 77 is moved rightward (toward the other side in the width direction) and the second downstream main vise jaw 79 is moved leftward (toward the one side in the width direction). As the result, the product correspondent portion Wf of the workpiece W can be clamped by the downstream main vise mechanism 73.

When the non-leak valve 163 is closed in the above-mentioned state where the product correspondent portion Wf is clamped (a state shown in FIG. 2), the left cylinder chamber 89L of the downstream main moving cylinder 81 and the right cylinder chamber 99R of the downstream main shifting cylinder are isolated from each other. However, a pressure is applied to the working oil in the left cylinder chamber 89L of the downstream main moving cylinder 81 by the pump 111. Therefore, clamping of the product correspondent portion Wf is kept due to balances among the leftward thrust force of the downstream main shifting cylinder 91 (maintained oil pressure in the right cylinder chamber 99R), the rightward thrust force of the downstream main moving cylinder 81 and (rightward and leftward) reactive forces from the workpiece W. Note that, since the working oil in the left cylinder chamber 99L of the downstream main shifting cylinder 91 is maintained, the second downstream main vise jaw 79 gets into its fixed state (immovable) with respect to the downstream main vise bed 75 (see FIG. 4(b)). In addition, since the oil pressure by the pump 111 doesn't change and clamping of the product correspondent portion Wf is kept, the first downstream main vise jaw 77 also gets into its fixed state (immovable) with respect to the downstream main vise bed 75 (see FIG. 4(b)).

On the other hand, when the P port and the B port are communicated with each other and the T port and the A port are communicated with each other by operating the control valve 153 with the pump 111 being operated, working oil is supplied to the right cylinder chamber 89R of the downstream main moving cylinder 81 through the main pipe 109, the pipe 155 and the pipe 157. In addition, working oil in the left cylinder chamber 89L of the downstream main moving cylinder 81 is discharged to the tank 113 through the pipe 151, the pipe 159 and the main pipe 119. Along with it, working oil is supplied to the left cylinder chamber 99L of the downstream main shifting cylinder 91 through the main pipe 109, the pipe 155, the pipe 157 and the pipe 165. In addition, working oil in the right cylinder chamber 99R of the downstream main shifting cylinder 91 is discharged to the tank 113 through the pipe 161, the pipe 151, the pipe 159 and the main pipe 119. According to this, the first downstream main vise jaw 77 is shifted leftward, and the second downstream main vise jaw 79 is shifted rightward. As the result, clamping of the product correspondent portion Wf by the downstream main vise mechanism 73 is released.

Subsequently, operations and advantaged of the workpiece feed/clamp apparatus 13 (the band saw machine 1) will be described.

By operating the feed vise shifting cylinder 35 in a state where a workpiece W is interposed between the pair of feed vise jaws 21 and 23, the second feed vise jaw 23 is shifted leftward and thereby the vise surface 23s of the second feed vise jaw 23 is located at the vise reference position VP. Then, the first feed vise jaw 21 is moved rightward by operating the feed vise moving cylinder 25. According to this, the workpiece W is clamped by the pair of feed vise jaws 21 and 23. Note that the vise surface 23s of the second feed vise jaw 23 may be located at the vise reference position VP before the workpiece W is interposed between the pair of feed vise jaws 21 and 23.

After clamping the workpiece W by the pair of feed vise jaws 21 and 23, the feed vise bed 19 (the feed vise mechanism 17) is moved along the feed direction (forward direction) by operating the electric motor (or the oil hydraulic cylinder). According to this, the workpiece W is fed along the feed direction to set the cut position Wa of the workpiece W at the cutting position CP. At this time, a portion of the workpiece W is interposed between the pair of upstream main vise jaws 49 and 51, and the product correspondent portion Wf of the workpiece W is interposed between the pair of downstream main vise jaws 77 and 79.

After setting the cut position Wa of the workpiece W at the cutting position CP, the second upstream main vise jaw 51 is shifted leftward by operating the upstream main shifting cylinder 63 to set the vise surface 51s of the second upstream main vise jaw 51 at the vise reference position VP. Then, the first upstream main vise jaw 49 is moved rightward by operating the upstream main moving cylinder 53. According to this, the workpiece W is clamped by the pair of upstream main vise jaws 49 and 51, and thereby the workpiece W is fixed on the base 3. Note that the vise surface 51s of the second upstream main vise jaw 51 may be set at the vise reference position VP before the cut position Wa of the workpiece W is set at the cutting position CP.

After clamping the workpiece W by the pair of upstream main vise jaws 49 and 51, the first downstream main vise jaw 77 is moved rightward by operating the downstream main moving cylinder 81 and the second downstream main vise jaw 79 is shifted leftward by operating the downstream main shifting cylinder 91. According to this, the product correspondent portion Wf of the workpiece W is clamped by the pair of downstream main vise jaws 77 and 79. Here, if a leading end portion of the workpiece W doesn't curve as shown in FIG. 1, the vice surface 79s of the second downstream main vise jaw 79 is set at the vise reference position VP.

Figure 5:
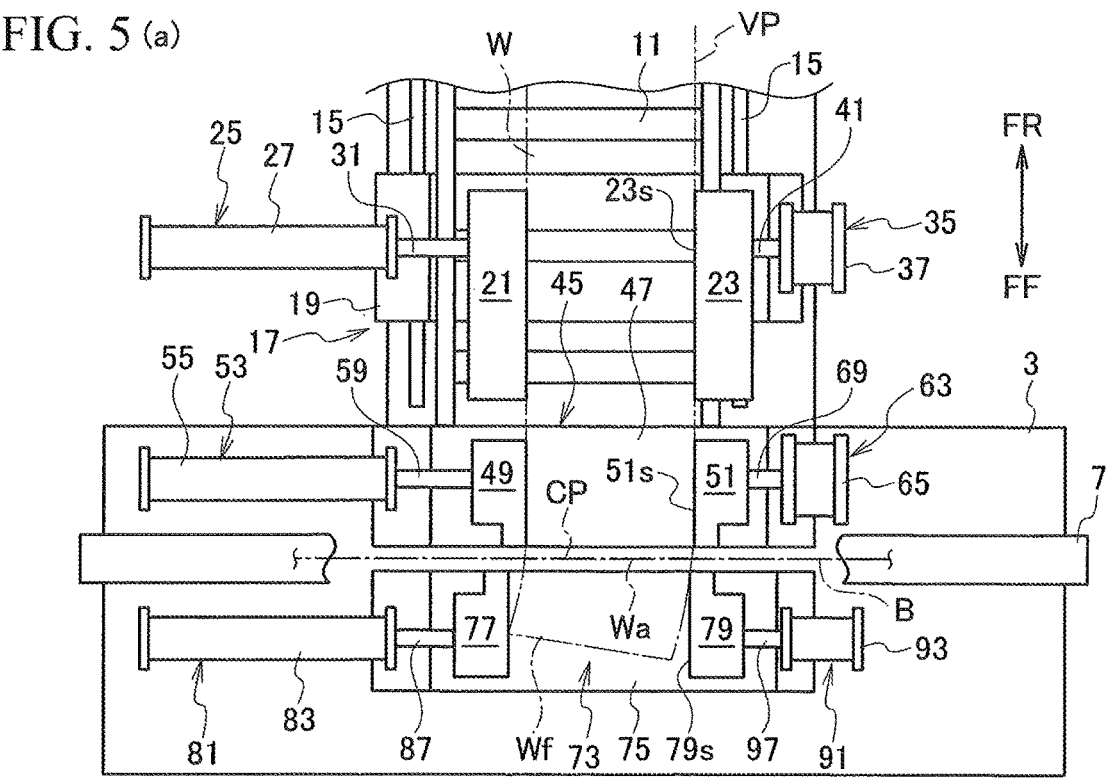
FIG. 5(a) and FIG. 5(b) are plan views for explaining operations of the workpiece feed/clamp apparatus.
Figure 5:
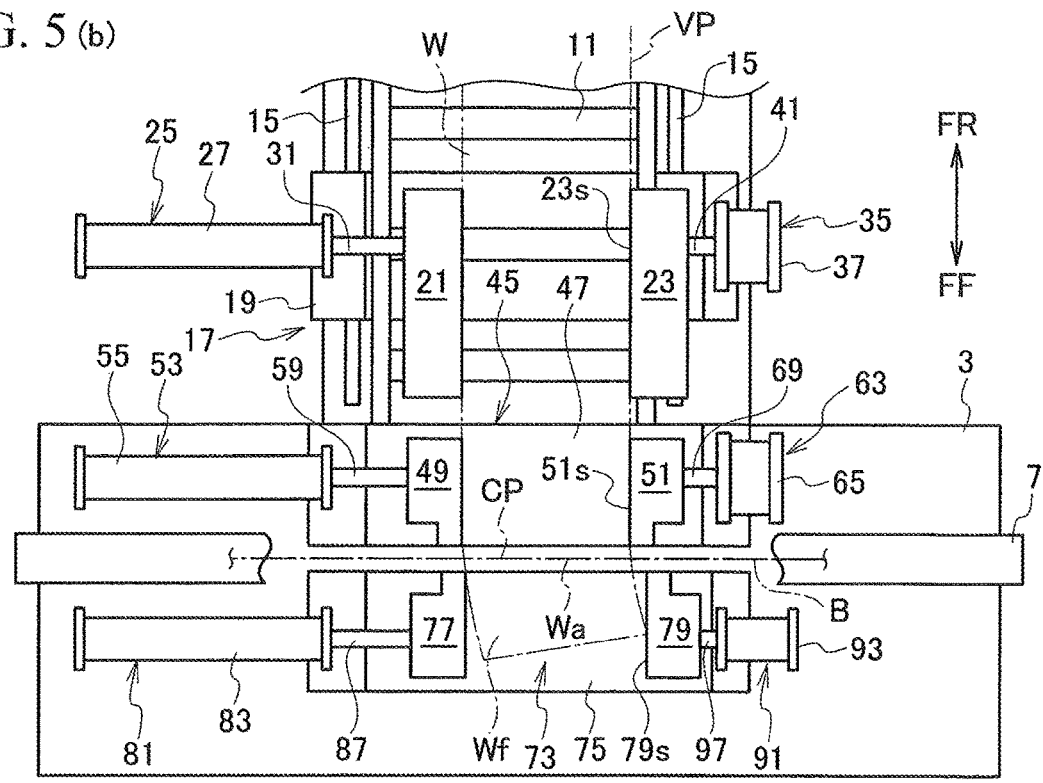

However, if a leading end portion of the workpiece W curves leftward (toward the one side in the width direction) as shown in FIG. 5(a), the vise surface 79s of the second downstream main vise jaw 79 passes over the vise reference position VP and then is located at a left side of the vise reference position VP due to a balance of the leftward thrust force of the downstream main shifting cylinder 91 and the rightward thrust force of the downstream main moving cylinder 81. On the other hand, if a leading end portion of the workpiece W curves rightward (toward the other side in the width direction) as shown in FIG. 5(b), the vise surface 79s of the second downstream main vise jaw 79 is located at a right side of the vise reference position VP due to a balance of the leftward thrust force of the downstream main shifting cylinder 91 and the rightward thrust force of the downstream main moving cylinder 81.

After clamping the product correspondent portion Wf of the workpiece W by the pair of downstream main vise jaws 77 and 79, the non-leak valve 163 is changed from its opened state into its closed state (state shown in FIG. 2). According to this, the pair of downstream main vise jaws 77 and 79 gets into its fixed state (immovable) with respect to the downstream main vise bed 75. Especially, the right cylinder chamber 99R of the downstream main shifting cylinder 91 is isolated by the non-leak valve 163, and thereby the right cylinder chamber 99R is sealed so as to keep a pressure of the working oil sufficiently high for clamping the product correspondent portion Wf of the workpiece W. As the result, the position of the second downstream main vise jaw 79 is fixed firmly at the vise reference position due to balances among the leftward thrust force of the downstream main shifting cylinder 91 (maintained oil pressure in the right cylinder chamber 99R), the rightward thrust force of the downstream main moving cylinder 81 and the (rightward and leftward) reactive forces from the workpiece W.

After changing the non-leak valve 163 from its opened state into its closed state, the cutting head 7 is moved downward with the band saw blade B being circularly run by rotating the pair of saw blade wheels. According to this, the cut portion Wa of the workpiece W is cut, and thereby a product is cut out from the workpiece W.

Note that, if a load is applied to the product correspondent portion Wf during cutting, a pressure is applied to the left cylinder chamber 89L (the pump 111 is being driven) so as to make the thrust force of the downstream main moving cylinder 81 and the reactive force of the product correspondent portion Wf balanced. The oil pressure of the left cylinder chamber 89L of the downstream main moving cylinder 81 and the oil pressure of the right cylinder chamber 99R (isolated by the non-leak valve 163) of the downstream main shifting cylinder 91 are balanced, and then clamping of the product correspondent portion Wf by the pair of downstream main vise jaws 77 and 79 is maintained. Here, since the downstream main shifting cylinder 91 isn't displaced substantially and the working oil in the right cylinder chamber 99R doesn't expand nor shrink substantially (the pressure of the working oil in the right cylinder chamber 99R is kept sufficiently high), the position of the product correspondent portion Wf is also kept firmly.

As described above, it is configured so that the vise surface 79s of the second downstream main vise jaw 79 passed over the vise reference position VP and then is located on a left side of the vise reference position VP when the downstream main shifting cylinder 91 reaches its left-side stroke end. According to this, it is possible to clamp the product correspondent portion Wf of the workpiece W firmly by the pair of downstream main vise jaws 77 and 79, even if a leading end portion of the workpiece W curves leftward.

In addition, as described above, the leftward thrust force of the downstream main shifting cylinder 91 is set (substantially) equal to the rightward thrust force of the downstream main moving cylinder 81. According to this, no large force is applied leftward (toward the one side of the width direction) to a product that has been cut out, even if a leading end portion of the workpiece W curves rightward.

Further, as described above, it is possible to fix the pair of downstream main vise jaws 77 and 79 with respect to the downstream main vise bed 75 by the balances among the leftward thrust force of the downstream main shifting cylinder (maintained oil pressure in the right cylinder chamber 99R), the rightward thrust force of the downstream main moving cylinder 81 and the (rightward and leftward) reactive forces from the workpiece W. Therefore, it is possible, after cutting, to prevent the product correspondent portion Wf cut out by the circularly-running band saw blade B from moving. In addition, it is possible to fix the product correspondent portion Wf firmly on the base 3 even if a large load is applied to the workpiece W.

Therefore, according to the present embodiment, as described above, it is possible to clamp the product correspondent portion Wf of the workpiece W firmly by the pair of downstream main vise jaws 77 and 79, even if a leading end portion of the workpiece W curves leftward. In addition, as described above, no large force is applied leftward (toward the one side in the width direction) to a product that has been cut out. Therefore, according to the present embodiment, the product that has been cut out never moves in the width direction after cutting, and thereby anti-chipping performance of saw teeth of the band saw blade B can be advanced. As the result, life (endurance) of the band saw blade B can be enhanced.

In particular, as described above, it is possible, after cutting, to prevent the product correspondent portion Wf cut out by the circularly-running band saw blade B from moving, and to fix the product correspondent portion Wf firmly on the base 3 even if a large load is applied to the workpiece W. Therefore, anti-chipping performance of saw teeth of the band saw blade B can be advanced. As the result, life (endurance) of the band saw blade B can be enhanced.

Note that the upstream main shifting cylinder 63 that generates a large thrust force in the upstream main vise mechanism 45 (the feed vise shifting cylinder 35 that generates a large thrust force in the feed vise mechanism 17) is located downstream in a circularly-running direction of the band saw blade B. According to this configuration, since a force tends to be applied from upstream to downstream in the circularly-running direction during cutting of the workpiece W, it is possible to hold the workpiece W firmly. Similarly, the downstream main shifting cylinder 91 connected with the non-leak valve 163 in the downstream main vise mechanism 73 is also located downstream in the circularly-running direction of the band saw blade B. According to this configuration, since a force tends to be applied from upstream to downstream in the circularly-running direction during cutting of the workpiece W, it is possible to hold the workpiece W firmly without displacing the position of the workpiece W by preventing the downstream main shifting cylinder 91 from being shifted.

The present invention is not limited to the above embodiment. For example, the upstream main vise mechanism 45 may be omitted. In this case, the workpiece W is clamped by the feed vise mechanism 17 and the downstream main vise mechanism 73 during cutting. In addition, the present invention can be applied, not to the band saw machine 1, but also to some other types of cutting machines such as a disc saw machine.

The aspect of the present invention may be also defined as below.
1. A workpiece feed/clamp apparatus that is used in a cutting machine for cutting a cut position of a workpiece set at a cut position on a feed direction and that feeds the workpiece in the feed direction and then fixes the workpiece on a base of the cutting machine, the apparatus comprising:
a feed vise mechanism provided on an upstream side of the cutting position; and
a downstream main vise mechanism provided just on a downstream side of the cutting position,
wherein the feed vise mechanism includes
a pair of first and second feed vise jaws that are provided movably in the feed direction so as to face to each other in a width direction perpendicular to the feed direction and clamp the workpiece,
a feed vise moving cylinder that moves the first feed vise jaw in the width direction, and
a feed vise shifting cylinder that shifts the second feed vise jaw in the width direction,
wherein the downstream main vise mechanism includes
a pair of first and second downstream main vise jaws that face to each other in the width direction and clamp a portion correspondent to a product in the workpiece,
a downstream main moving cylinder that moves the first downstream main vise jaw in the width direction, and
a downstream main shifting cylinder that shifts the second downstream main vise jaw in the width direction,
wherein a vise surface of the second downstream main vise jaw passes over a vise reference position in the width direction that serves as reference for feeding the workpiece and then is located on one side from the vise reference position in the width direction when the downstream main shifting cylinder reaches a stroke end on the one side in the width direction, and
wherein a thrust force of the downstream main shifting cylinder toward the one side in the width direction is made equal to a thrust force of the downstream main moving cylinder toward another side in the width direction.

2. The workpiece feed/clamp apparatus according to the above 1, further comprising
an upstream main vise mechanism provided just on an upstream side of the cutting position, and
wherein the upstream main vise mechanism includes
a pair of first and second upstream main vise jaws that are provided so as to face to each other in the width direction and clamp the workpiece,
an upstream main moving cylinder that moves the first upstream main vise jaw in the width direction, and
an upstream main shifting cylinder that shifts the second upstream main vise jaw in the width direction.

3. The workpiece feed/clamp apparatus according to the above 1 or 2, wherein
a cylinder chamber of the downstream main shifting cylinder on the other side of the width direction is connected with a working fluid supply source that supplies working fluid through a pipe, and
a non-leak valve is provided on the pipe.

4. The workpiece feed/clamp apparatus according to the above 3, wherein
a cylinder chamber of the downstream main shifting cylinder on the one side in the width direction is communicated with a cylinder chamber of the downstream main moving cylinder on the other side in the width direction.

5. The workpiece feed/clamp apparatus according to any one of the above 1 to 4, wherein working fluid having an identical pressure is supplied to a cylinder chamber of the downstream main moving cylinder on the one side in the width direction and a cylinder chamber of the downstream main shifting cylinder on the other side in the width direction, and
a cross-sectional area of the cylinder chamber of the downstream main shifting cylinder on the other side in the width direction is made equal to a cross-sectional area of the cylinder chamber of the downstream main moving cylinder on the one side in the width direction.

6. A cutting machine that cuts a cut portion of a workpiece set at a cutting position on a feed direction, the machine comprising:
a workpiece feed/clamp apparatus according to any one of the above 1 to 5.

The entire contents of a Japanese Patent Application No. 2015-199970 (filed Oct. 8, 2015) and a Japanese Patent Application No. 2016-175285 (filed Sep. 8, 2016) are incorporated herein by reference. Although the invention has been described above by reference to a certain embodiment of the invention, the invention is not limited to the embodiment described above. Scope of the present invention is determined in the context of the claims.

The invention claimed is:
1. A workpiece feed/clamp apparatus that is used in a cutting machine for cutting a cut position of a workpiece set at a cut position on a feed direction, the feed/clamp apparatus being configured to feed the workpiece in the feed direction and then to fix the workpiece on a base of the cutting machine so as to restrict a product cut out from the workpiece against movement, the apparatus comprising:
a feed vise mechanism that is provided on an upstream side of the cutting position movably in the feed direction and includes a pair of feed vise jaws that face to each other in a width direction perpendicular to the feed direction and clamp the workpiece, a hydraulic feed vise moving cylinder that moves a first of the feed vise jaws in the width direction, and a hydraulic feed vise shifting cylinder that shifts a second of the feed vise jaws in the width direction;
a downstream main vise mechanism that is provided just on a downstream side of the cutting position and includes a pair of downstream main vise jaws that face each other in the width direction and clamp a portion correspondent to the product in the workpiece, a hydraulic downstream main moving cylinder that moves a first of the downstream main vise jaws in the width direction, and a hydraulic downstream main shifting cylinder that shifts a second of the downstream main vise jaws in the width direction; and
a hydraulic control unit comprising hydraulic control valves configured to drive the hydraulic feed vise moving cylinder, the hydraulic feed vise shifting cylinder, the hydraulic downstream main moving cylinder, and the hydraulic downstream main shifting cylinder, such that:
a thrust force of the hydraulic downstream main shifting cylinder toward one side in the width direction is made equal to a thrust force of the hydraulic downstream main moving cylinder toward another side in the width direction,
a position in the width direction where a vise surface of the second of the feed vise jaws is located when the hydraulic feed vise shifting cylinder reaches a stroke end on an extended side thereof serves as a vise reference position, and the feed/clamp apparatus is configured so that, if a leading end portion of the workpiece curves, the vise surface of the second of the downstream main vise jaws is located at the one side or the other side of the vise reference position in the width direction according to a curvature of the leading end portion of the workpiece when the portion correspondent to the product in the workpiece is clamped by cooperation of the pair of downstream main vise jaws.

2. The workpiece feed/clamp apparatus according to claim 1, further comprising:
an upstream main vise mechanism that is provided just on an upstream side of the cutting position and includes a pair of upstream main vise jaws that face to each other in the width direction and clamp the workpiece;
a hydraulic upstream main moving cylinder that moves a first of the upstream main vise jaws in the width direction;
a hydraulic upstream main shifting cylinder that shifts a second of the upstream main vise jaws in the width direction; and
the hydraulic control unit further comprising second hydraulic control valves configured to drive the hydraulic upstream main moving cylinder and the hydraulic upstream main shifting cylinder.

3. The workpiece feed/clamp apparatus according to claim 1, wherein a cylinder chamber of the hydraulic downstream main shifting cylinder on the other side of the width direction is connected with a working fluid supply source that supplies working fluid through a pipe, and a non-leak valve is provided on the pipe.

4. The workpiece feed/clamp apparatus according to claim 3, wherein a cylinder chamber of the hydraulic downstream main shifting cylinder on the one side in the width direction is communicated with a cylinder chamber of the downstream main moving cylinder on the other side in the width direction.

5. The workpiece feed/clamp apparatus according to claim 1, wherein working fluid having an identical pressure is supplied to a cylinder chamber of the hydraulic downstream main moving cylinder on the one side in the width direction and a cylinder chamber of the hydraulic downstream main shifting cylinder on the other side in the width direction, and a cross-sectional area of the cylinder chamber of the hydraulic downstream main shifting cylinder on the other side in the width direction is made equal to a cross-sectional area of the cylinder chamber of the hydraulic downstream main moving cylinder on the one side in the width direction.

6. A cutting machine that cuts a cut portion of a workpiece set at a cutting position on a feed direction, the machine comprising:
a workpiece feed/clamp apparatus according to claim 1.

7. A workpiece feed/clamp apparatus that is used in a cutting machine for cutting a cut position of a workpiece set at a cut position on a feed direction, the feed/clamp apparatus being configured to feed the workpiece in the feed direction and then to fix the workpiece on a base of the cutting machine so as to restrict a product cut out from the workpiece against movement, the apparatus comprising:
an upstream main vise mechanism that is provided just on an upstream side of the cutting position and includes a pair of upstream main vise jaws that face each other in a width direction perpendicular to the feed direction and clamp the workpiece, a hydraulic upstream main vise moving cylinder that moves a first of the upstream vise jaws in the width direction, and a hydraulic upstream main vise shifting cylinder that shifts a second of the upstream main vise jaws in the width direction;
a downstream main vise mechanism that is provided just on a downstream side of the cutting position and includes a pair of downstream main vise jaws that face each other in the width direction and clamp a portion correspondent to a product in the workpiece, a hydraulic downstream main moving cylinder that moves a first of the downstream main vise jaws in the width direction, and a hydraulic downstream main shifting cylinder that shifts a second of the downstream main vise jaws in the width direction; and
a hydraulic control unit comprising hydraulic control valves configured to drive the hydraulic upstream main vise moving cylinder, the hydraulic upstream main vise shifting cylinder, the hydraulic downstream main moving cylinder, and the hydraulic downstream main shifting cylinder, such that:
a thrust force of the hydraulic downstream main shifting cylinder toward one side in the width direction is made equal to a thrust force of the hydraulic downstream main moving cylinder toward another side in the width direction,
a position in the width direction where a vise surface of the second of the feed vise jaws is located when the hydraulic upstream main vise shifting cylinder reaches a stroke end on an extended side thereof serves as a vise reference position, and
the feed/clamp apparatus is configured so that, if a leading end portion of the workpiece curves, the vise surface of the second of the downstream main vise jaws is located at the one side or the other side of the vise reference position in the width direction according to a curvature of the leading end portion of the workpiece when the portion correspondent to the product in the workpiece is clamped by cooperation of the pair of downstream main vise jaws.

* * * * *